United States Patent
Hanna et al.

(10) Patent No.: US 9,834,299 B2
(45) Date of Patent: Dec. 5, 2017

(54) RAIL SYSTEM FOR SEAT ASSEMBLY IN AN AIRCRAFT

(71) Applicant: Airbus Operations GmbH, Hamburg (DE)

(72) Inventors: Klaus Hanna, Hamburg (DE); Daniele Bruno, Hamburg (DE); Rainer Kriewall, Glinde (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/613,806

(22) Filed: Feb. 4, 2015

(65) Prior Publication Data
US 2015/0225067 A1    Aug. 13, 2015

(30) Foreign Application Priority Data
Feb. 7, 2014   (DE) .................. 10 2014 202 288

(51) Int. Cl.
*B64C 1/20* (2006.01)
*H02G 3/38* (2006.01)
*H02G 3/04* (2006.01)

(52) U.S. Cl.
CPC .............. *B64C 1/20* (2013.01); *H02G 3/385* (2013.01); *H02G 3/0418* (2013.01); *H02G 3/0437* (2013.01)

(58) Field of Classification Search
CPC ....... B64C 1/20; H02G 3/0437; H02G 3/0418
USPC ..................................................... 244/122 R
See application file for complete search history.

(56) References Cited

U.S. PATENT DOCUMENTS

| | | | | |
|---|---|---|---|---|
| 3,381,921 A | * | 5/1968 | McDonough | B64D 9/003 105/370 |
| 3,578,274 A | * | 5/1971 | Ginn | B64D 9/00 24/596.1 |
| 3,800,713 A | * | 4/1974 | Nordstrom | B64D 9/003 410/79 |
| 4,773,791 A | | 9/1988 | Hartkorn | |
| 4,936,527 A | * | 6/1990 | Gorges | B64D 11/0696 104/165 |

(Continued)

FOREIGN PATENT DOCUMENTS

DE          19923489      11/2000
DE     10 2011 111 864    2/2013

OTHER PUBLICATIONS

German Search Report for Application No. 10 2014 202 288.6 dated Aug. 26, 2014.

(Continued)

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

A rail system, in particular for assembling or fastening seats in an aircraft, includes an assembly rail, in particular a seat rail for assembling or fastening a seat, a first panel, in particular a first floor panel for arrangement next to and substantially in parallel with the assembly rail, at least one cover element which is movable for covering the assembly rail, and a levelling device for levelling the upper surface of the first panel, in particular for levelling a recess or depression in said panel when the at least one cover element covers the assembly rail.

19 Claims, 3 Drawing Sheets

(56) References Cited

U.S. PATENT DOCUMENTS

| | | | | |
|---|---|---|---|---|
| 5,131,606 A * | 7/1992 | Nordstrom | ............ | B64D 9/003 244/118.1 |
| 6,039,288 A * | 3/2000 | Huber | ............ | B64C 1/20 193/35 MD |
| 6,302,358 B1 * | 10/2001 | Emsters | ............ | B64C 1/20 244/137.1 |
| 6,343,908 B1 | 2/2002 | Oudsten et al. | | |
| 6,875,916 B2 * | 4/2005 | Winkelbach | ............ | B64C 1/18 174/482 |
| 7,784,799 B2 * | 8/2010 | Etling | ............ | B64C 1/12 277/630 |
| 7,926,762 B2 * | 4/2011 | Oetken | ............ | B64C 1/20 244/118.1 |
| 9,238,504 B2 * | 1/2016 | Huber | ............ | B64C 1/20 |
| 2003/0106962 A1 | 6/2003 | Smallhorn | | |
| 2004/0100117 A1 | 5/2004 | Rhodes | | |
| 2005/0140098 A1 | 6/2005 | Etling | | |
| 2006/0075934 A1 | 4/2006 | Ram | | |
| 2007/0089746 A1 | 4/2007 | Mitchell | | |
| 2012/0312920 A1 | 12/2012 | Huber | | |
| 2013/0048785 A1 | 2/2013 | Grosse-Plankermann et al. | | |
| 2013/0278002 A1 | 10/2013 | Preisler | | |
| 2013/0278008 A1 | 10/2013 | Preisler | | |
| 2013/0278009 A1 | 10/2013 | Preisler | | |
| 2015/0061380 A1 | 3/2015 | Schomacker | | |
| 2015/0225066 A1 | 8/2015 | Hanna et al. | | |

OTHER PUBLICATIONS

German Search Report for Application No. 10 2014 202 287.8 dated Sep. 2, 2014.
Non-Final Office Action for U.S. Appl. No. 14/613,731 dated May 11, 2016.
Non-Final Office Action for U.S. Appl. No. 14/613,731 dated Mar. 9, 2017.
Final Office Action for U.S. Appl. No. 14/613,731 dated Nov. 18, 2016.
Advisory Action for U.S. Appl. No. 14/613,731 dated Feb. 10, 2017.

* cited by examiner

RAIL SYSTEM FOR SEAT ASSEMBLY IN AN AIRCRAFT

CROSS-REFERENCE TO RELATED APPLICATION

This application claims priority to DE 10 2014 202 288.6 filed Feb. 7, 2014, the entire disclosure of which is incorporated by reference herein.

TECHNICAL FIELD

The subject matter disclosed herein relates to a rail system, in particular for assembling or fastening objects in a vehicle.

Here, the rail system according to the subject matter disclosed herein has been configured in particular for use in the assembly or fastening of seats in an aircraft. However, it is also possible for the system to be used in other ways, for example in the assembly or fastening of freight containers or palettes during transportation in a vehicle.

BACKGROUND

When seats are assembled or fastened in an aircraft by the conventional method, assembly rails (so-called seat rails) are used on the deck of the fuselage structure. The seat rails run in the longitudinal direction of the aircraft and have a plurality of connection points or fastening points at regular intervals along the rail (for example, at every inch). The connection points or fastening points thus allow a high level of flexibility in the determination and configuration of the seating space between the rows of seats. The seat rails are fixed approximately in parallel with one another on the deck and the seats can then be fastened closer together or further apart on the rails in the longitudinal direction of the aircraft at the discretion of the airline company.

However, since the seat rails are usually fixed on the deck, they can create an obstacle on the floor. Although such obstacles can be overcome using appropriately configured floor coverings, solutions of this type can also be associated with high costs. However, it is then often impossible to change the seating arrangement quickly, because the floor coverings must firstly be removed or dismantled.

SUMMARY

Therefore, an idea of the subject matter disclosed herein is to configure a new rail system for assembling or fastening seats in an aircraft, in which the seat rails do not create an obstacle on the floor and in which it is possible to reconfigure the seating arrangement in a relatively fast and/or uncomplicated manner. Furthermore, if anything the rail system should have a reliable and economical construction.

According to an aspect of the subject matter disclosed herein, a rail system, in particular for assembling or fastening seats in a vehicle is provided, said rail system comprising:
an assembly rail, in particular a seat rail for assembling or fastening a seat;
a first panel, in particular a first floor panel for arrangement next to and substantially in parallel with the assembly rail;
at least one cover element which is movable for covering the assembly rail and is preferably provided in or on the first panel; and
a levelling device for levelling a surface of the first panel, in particular for levelling a recess or depression in the first panel, when the at least one cover element covers the assembly rail.

In this manner, the subject matter disclosed herein provides a rail system, by which a substantially flat or planar floor surface can be provided, in particular in that unevennesses in the surface of the first panel or floor panel due to a recess or depression for the at least one cover element can be levelled out. In a preferred embodiment of the subject matter disclosed herein, the levelling device comprises a filler element in the first panel, which filler element is movable in order to level or fill said recess or depression in the first panel. In this case, the filler element is preferably configured such that it is movable from an inactive (non-actuated) position into a filling position. In this filling position, an upper surface of the filler element is substantially in a plane with the upper surface of the first panel.

In one embodiment of the subject matter disclosed herein, the levelling device comprises an actuating mechanism for moving the filler element into the filling position. Preferably, the actuating mechanism comprises a screw element, the rotation of which is used to produce a movement of the filler element along a thread axis of the screw element. Thus, for example a full rotation, a half rotation or even a quarter rotation of the screw would be able to produce sufficient movement of the filler element in order to level out a recess or depression for receiving the cover element in the first panel. In this manner, the screw element can lift or move the filler element into the filling position. If the screw element produces a vertical movement that is the same as the height of the recess in the upper side of the first panel, the filler element can level said recess as a result of its lifting movement and can provide a flat or planar surface.

In a further embodiment of the subject matter disclosed herein, the at least one cover element is movable between a first position in or on the first panel and a second position for covering the assembly rail. Here, an upper surface of the at least one cover element in the second position is located substantially in a plane with a surface of the first panel, and preferably also merges in a planar manner and substantially smoothly into the surface of the first panel. As mentioned above, the subject matter disclosed herein can thus provide a rail system, by which a substantially flat or planar floor surface can be provided. The assembly rail or seat rail may be offset under the plane of the surface (the upper surface) of the first panel, so that the at least one cover element can extend in the plane of the upper surface of the first panel over the assembly rail. For this purpose, the at least one cover element can be configured as a substantially flat and rigid or semi-rigid element and is preferably configured as a flap, a tab, a plate or a sheet.

In a further embodiment of the subject matter disclosed herein, the at least one cover element is positioned on the first panel or on the first floor panel and is optionally also fastened thereto. In this respect, in the first position, the at least one cover element can be located or received in a recess in or on the first panel. In a specific embodiment of the subject matter disclosed herein, in the first position, an upper surface of the at least one cover element can thus be located substantially in a plane with the surface of the first panel. The rail system according to the subject matter disclosed herein can thereby ensure that when the cover element is in the first position and also when it is in the second position, it is located or it remains in the plane of the surface of the first panel.

In a further embodiment of the subject matter disclosed herein, the upper surface of the cover element merges substantially smoothly into the surface of the first panel when the at least one cover element covers the assembly rail, i.e. when the cover element is in the second position. The levelling device is used for this purpose in particular and levels or fills a recess or a depression for receiving the cover element in the first panel.

In a further embodiment of the subject matter disclosed herein, the at least one cover element can be pivoted between the first position and the second position for covering the assembly rail, preferably in an angular range of approximately 180°. For this purpose, the at least one cover element may be attached by a hinge to the first panel or to the rail. In an alternative preferred embodiment, the at least one cover element can also be easily displaceable for covering the assembly rail, i.e. displaceable between the first and the second position.

In a further embodiment of the subject matter disclosed herein, the rail system can have a holder mechanism, for example a magnet mechanism or a catch mechanism or locking mechanism, by which the at least one cover element is held in at least one of the first and second positions. Furthermore, the at least one cover element can be pretensioned into at least one of the first and second positions, preferably by a spring or by a spring element.

In a further embodiment of the subject matter disclosed herein, the rail system has a plurality of cover elements which are arranged in a row next to one another along and next to or on the assembly rail. For this purpose, the assembly rail has a plurality of connection points or fastening points arranged at intervals, and each of the cover elements is arranged such that in the second position, it covers at least one connection point or at least one fastening point. In this respect, the connection points or fastening points can be covered and/or held open individually or in groups.

In a further embodiment of the subject matter disclosed herein, the rail system comprises a second panel, for example a second floor panel for arrangement next to and approximately in parallel with both the assembly rail and the first panel on one side of the assembly rail, opposite the first panel, such that a surface of the second panel is substantially in the plane with the surface of the first panel. In this manner, the cover elements can span the assembly rail between the first and second panels or floor panels.

In a further embodiment of the subject matter disclosed herein, the assembly rail has a projection, for example a flange for attaching or supporting an edge region or peripheral region of the first panel. In this respect, the at least one cover element is attached to the edge region or peripheral region of the first panel. Similarly, the assembly rail can have a further projection, for example a further flange for attaching or supporting an edge region or peripheral region of the second panel. For example, the assembly rail may also comprise at least one duct for guiding a cabling system, the at least one cover element also covering this at least one duct in the second position.

According to a further aspect of the subject matter disclosed herein, a rail system, in particular for assembling or fastening seats in an aircraft is provided, comprising:
an assembly rail, in particular a seat rail for assembling or fastening a seat or a plurality of seats;
a first panel, in particular a first floor panel for arrangement next to and substantially in parallel with the assembly rail; and
at least one cover element which is movable between a first position in or on the first panel and a second position for covering the assembly rail, wherein, in the second position, an upper surface of the at least one cover element is located substantially in a plane with a surface of the first panel.

According to a further embodiment of the subject matter disclosed herein, a vehicle, in particular an aircraft or spacecraft is provided which comprises a deck structure or fuselage structure having a rail system according to the subject matter disclosed herein as described above, in particular for fastening or assembling seats.

The configurations and developments of the subject matter disclosed herein described above can be combined together in any desired, sensible manner. Further possible configurations and implementations of the subject matter disclosed herein also include not explicitly mentioned combinations of features of the subject matter disclosed herein described previously or described in the following with reference to the embodiments. In particular, a person skilled in the art will also add individual aspects as improvements or additions to the respective basic form of the subject matter disclosed herein.

BRIEF DESCRIPTION OF THE DRAWINGS

In the following, the subject matter disclosed herein will be described in more detail on the basis of the embodiments described in the figures or drawings, in which.

DETAILED DESCRIPTION

Figure 1:
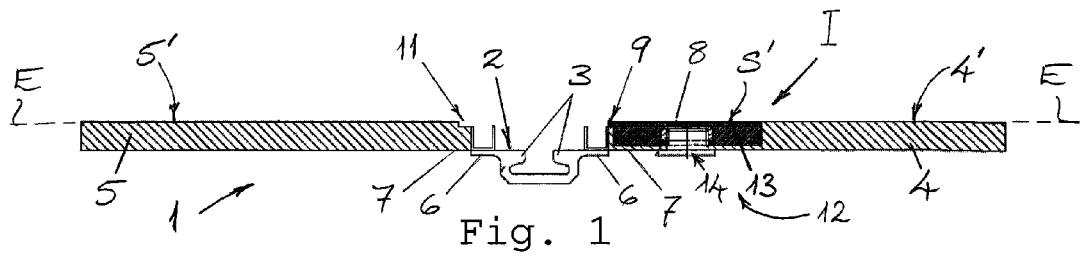
FIG. 1 is a cross-sectional view of a rail system according to an embodiment of the subject matter disclosed herein with a cover element in a first position I.

The accompanying figures or drawings are to provide further understanding of the preferred embodiments of the subject matter disclosed herein. They illustrate an embodiment and, together with the description, serve to explain principles and concepts of the subject matter disclosed herein. Other embodiments and many of the mentioned advantages are revealed with regard to the figures or drawings. The elements of the figures or drawings have not necessarily been shown true-to-scale relative to one another.

FIGS. 1 to 4 are cross-sectional views (i.e. views transverse to the longitudinal direction of the rail) of a rail system 1 for assembling or fastening seats in an aircraft according to an embodiment of the subject matter disclosed herein, in different operating stages. This rail system 1 is also shown in perspective views in FIGS. 5 to 8 which respectively correspond to FIGS. 1 to 4. Therefore, this embodiment of the rail system 1 according to the subject matter disclosed herein is described in the following with reference to the respective FIGS. 1 to 4 and 5 to 8.

The rail system 1 has an assembly rail 2, here in the form of an elongate seat rail, for fastening one or more passenger seats (not shown). The seat rail 2 is preferably configured as a profile element with an upwardly open cross section and with a plurality of connection points or fastening points 3 arranged at regular intervals along the length of the rail. Thus, corresponding connection elements can be introduced into the upwardly open profile of the rail seat 2 on the supporting frame of the passenger seats and they can be positioned on and fastened to the desired connection points or fastening points 3. The seat rail 2 typically consists of a robust material, preferably an aluminium alloy.

The rail system 1 also comprises a first floor panel 4 which is arranged next to and substantially in parallel with the seat rail 2 on one side of the seat rail 2, and also a second floor panel 5 which is also arranged next to and substantially in parallel with the seat rail 2 on the other side of the rail 2. In this connection, the seat rail 2 comprises two laterally outwardly running flanges 6 on opposite sides of the rail profile and each flange is used to attach or support an edge region or peripheral region 7 of the respective floor panels 4, 5. The floor panels 4, 5 are preferably produced from a composite material, such as fibre-reinforced plastics material (CFRP or GFRP). The dimensions of the floor panels 4, 5 and the arrangement thereof on the seat rail 2 are selected such that an upper surface 4' of the first panel 4 is substantially positioned in a plane E with an upper surface 5' of the second panel 5. The seat rail itself runs below the plane E.

Figure 5:
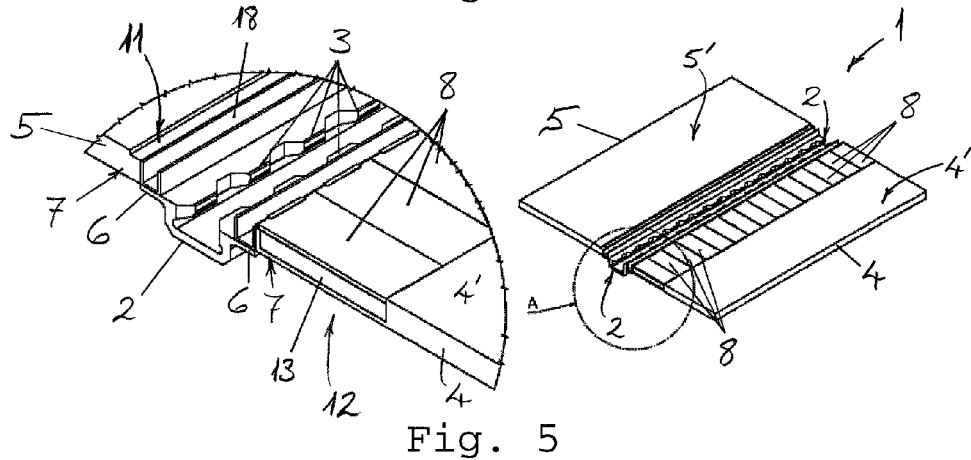
FIG. 5 is a perspective view of the rail system in FIG. 1 with detailed view "A"
Figure 6:
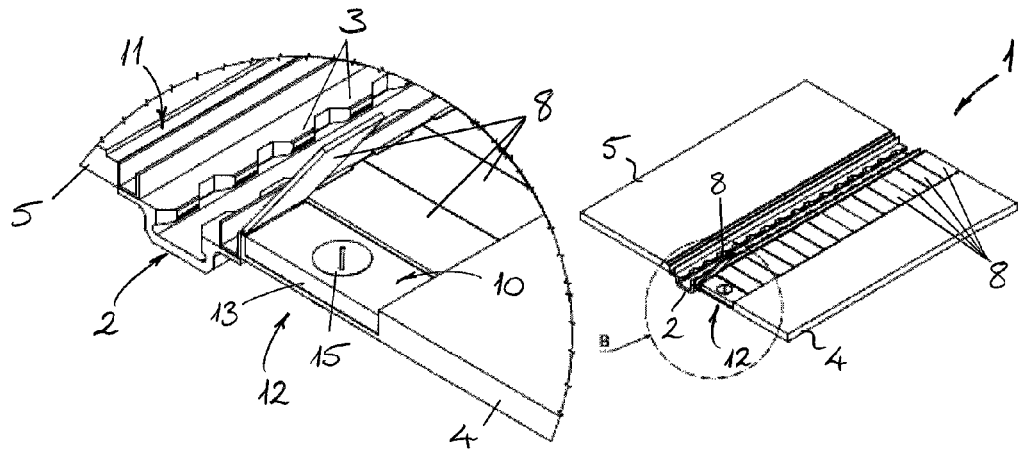
FIG. 6 is a perspective view of the rail system in FIG. 2 with detailed view "B"
Figure 7:
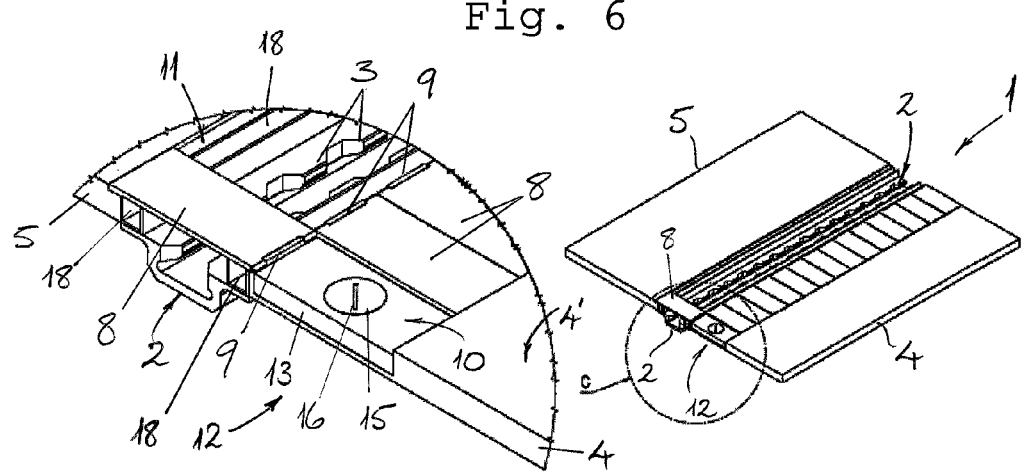
FIG. 7 is a perspective view of the rail system in FIG. 3 with detailed view "C"

As can be seen in FIGS. 5-8, the rail system 1 also has a plurality of rectangular cover elements 8 which are arranged in a row next to one another along the seat rail 2 on the edge region or peripheral region 7 of the first panel 4 and are attached such that they can pivot thereon. This pivotable connection of the cover elements 8 can be clearly seen in FIGS. 2, 6 and 7. In this respect, each cover element 8 is provided as a rectangular flap which is mounted rotatably by a hinge 9 on the peripheral region 7 of the first floor panel 4. Thus, this flap 8 can pivot to move through an angle of approximately 180° between a first position I in or on the first floor panel 4 (as shown in FIGS. 1 and 5) and a second position II in which the flap 8 extends over the seat rail 2 and covers said rail (as shown in FIGS. 3 and 7).

Referring now to FIGS. 1 and 5, an upper surface S of the cover element 8 is located substantially in the plane E of the surface 4' of the first floor panel 8 when the cover element 8 is in the first position I. This is achieved in that, in the first position I, the cover element 8 is located in a small recess or depression 10 in the upper side of the first floor panel 4. This recess or depression 10 can be seen particularly clearly in FIGS. 2 and 3 and FIGS. 6 and 7. Similarly, an upper surface S' of the cover element 8 is also located substantially in this plane E of the first and second floor panels 4, 5 when the cover element 8 is in the second position II, as shown in FIGS. 3 and 4 and FIGS. 7 and 8. For this purpose, a small recess or depression 11 is also provided in the second panel 5 corresponding to a height or thickness d of the cover element 8, in which recess or depression 11 the flap 8 is received in the second position II.

Figure 2:
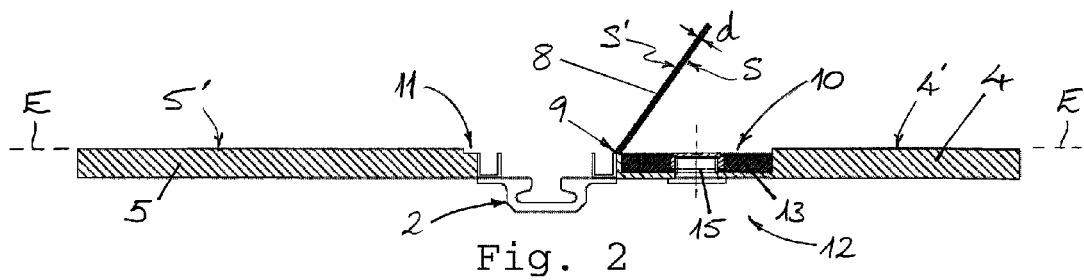
FIG. 2 is a cross-sectional view of the rail system in FIG. 1 with the cover element moving into a second position.
Figure 3:
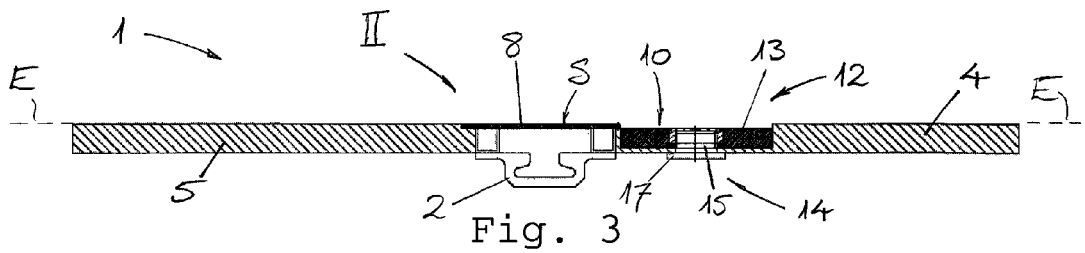
FIG. 3 is a cross-sectional view of the rail system in FIG. 1 with the cover element in the second position II.

As can be seen in FIGS. 2 and 3 and FIGS. 6 and 7, an unevenness arises in the region of the recess or depression 10 in the upper surface 4' of the first floor panel 4 when the cover element 8 is pivoted into the second position II. For this, the rail system 1 comprises a levelling device 12 for levelling this upper surface 4' of the first floor panel 4 when the cover element 8 covers the seat rail 2. In this embodiment, the levelling device 12 has a movable filler element 13 and an actuating mechanism 14 for moving the filler element 13. In FIGS. 1 to 3, the filler element 13 is in an inactive, recessed position in the first floor panel 4 under the recess or depression 10. The actuating mechanism 14 comprises a screw element 15 which is rotatably mounted in the first panel 4 and the external thread of which screw engages in a corresponding internal thread in the filler element 13. The mode of operation of the levelling device 12 will now be described in more detail with reference to FIGS. 3 and 4 and FIGS. 7 and 8.

Figure 4:
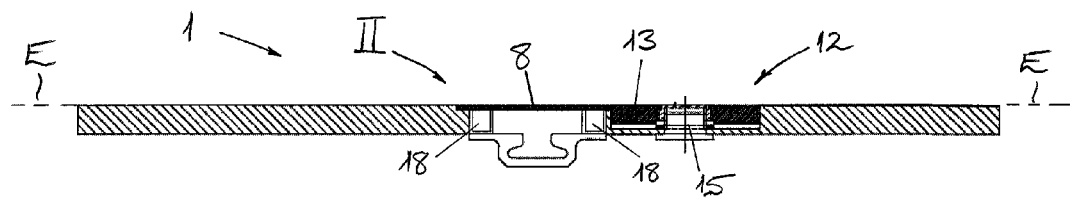
FIG. 4 is a cross-sectional view of the rail system in FIG. 1 with the filler element screwed on in a filling position.
Figure 8:
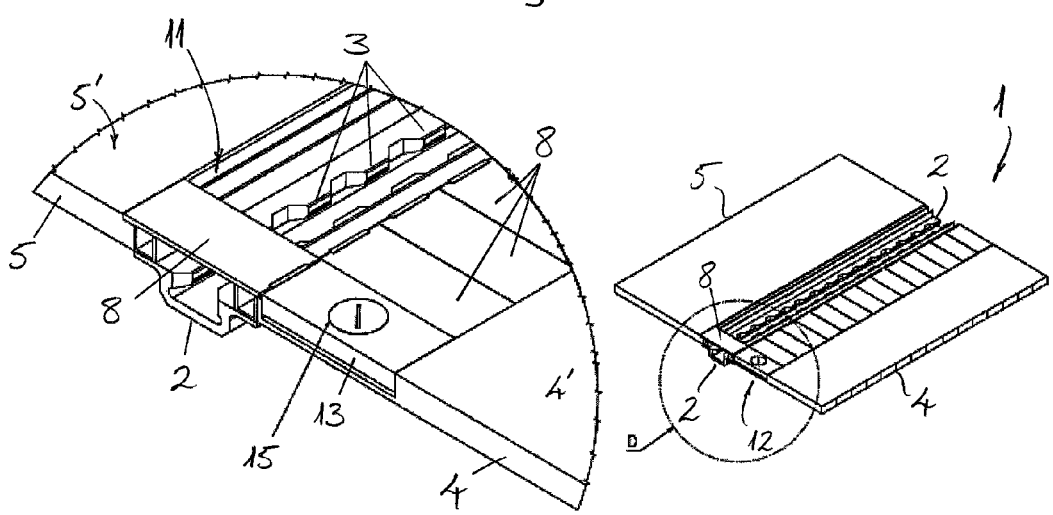
FIG. 8 is a perspective view of the rail system in FIG. 4 with detailed view "D"

As can be seen clearly in FIGS. 7 and 8, the screw element 15 has a slit 16 at its upper end, into which slit a tool such as a screwdriver can be inserted in order to rotate the screw element 15. Because the screw element 15 is protected, by a screw head 17 and a collar, against an axial movement in its axial direction in the first floor panel 4, the rotation of the screw 15 produces a corresponding movement of the filler element 13 in the axial direction. In other words, the screw element 15 is rotated for example through an angle of approximately 180° between FIG. 7 and FIG. 8, and the interlocking threads lift the filler element 13 out of the inactive, inserted position into a filling position in which an upper surface of the filler element 13 is located substantially in the plane E of the first floor panel 4, and specifically such as to merge substantially smoothly into the upper surface S' of the cover element 8. Thus, the recess or depression 10 in the upper surface 4' of the first floor panel 4 can now be filled by the filler element 13, as shown in FIGS. 4 and 8. Since, for its part, the cover element 8 is now located (also substantially smoothly) in the plane with the upper surface 5' of the second floor panel 5, a substantially continuously flat or planar surface is thus produced above the seat rail 2 between the two floor panels 4, 5.

Referring to FIGS. 1 to 4, the seat rail 2 has two ducts 18 which are each configured to guide a cable system. Each of the cover elements 8 extends over the ducts 18 in the second position II and also covers them. Although not shown, the rail system 1 according to the subject matter disclosed herein can also comprise a holder mechanism by which each cover element 8 is held in the second position II. For this purpose, magnets for example can be provided on the flap 8 and/or in the depression 11 to hold the flap 8 in the plane E in the depression 11. As an alternative or in addition, the depression 11 could have a catch mechanism or locking mechanism by which for example a free edge of the cover element 8 catches or locks in the second position II. Similarly, a corresponding holder mechanism could also be provided in the depression 10 to hold each cover element 8 in the first position I. As an alternative, each cover element 8 could be pretensioned into the first position, for example by a spring in the respective hinge 9.

As already mentioned with reference to FIGS. 5-8, the rail system 1 has a plurality of cover elements 8 which are arranged in a row next to one another along the rail 2 on the first floor panel 4. Each of the cover elements 8 or each of the flaps 8 corresponds to one of the connection points or fastening points 3 along the rail 2. Thus, any of the connection points or fastening points 3 which are not required for fastening the passenger seats can be covered by the respective cover elements 8 in the second position II—more specifically in a manner which produces a flat or planar floor and which substantially conceals the assembly rail 2. Furthermore, the rail system 1 according to the subject matter disclosed herein can allow for a fast adjustment of the passenger seats, which have already been assembled, by opening the directly adjacent cover elements 8 without having to remove the floor panels 4, 5.

Figure 9:
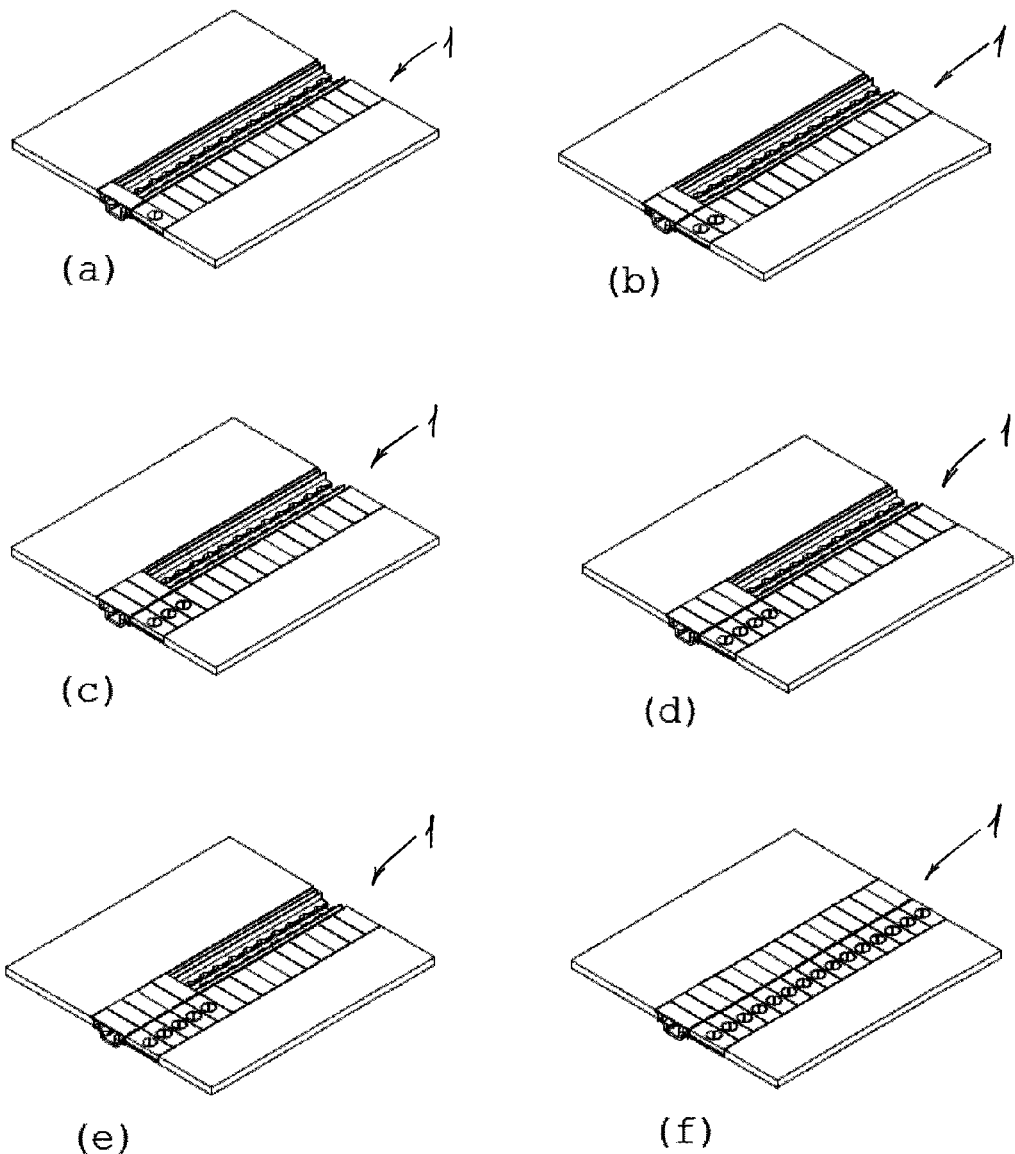
FIG. 9 is a perspective view of the rail system in FIG. 1 shown in (a) to (f) with an increasing number of cover elements in the second, closed position.

In the process sequence (a)-(f), FIG. 9 shows the rail system 1 according to the subject matter disclosed herein in which successively more of the cover elements or flaps 8 are moved out of the first position I into the second position II and the respective levelling devices 12 are used to achieve a planar or flat upper surface of the rail system 1. In FIG. 9(f), the assembly rail or seat rail 2 of the rail system is completely covered by the cover elements 8. The levelling devices 12 are also being used here so that a substantially continuously flat and planar floor surface is formed.

Figure 10:
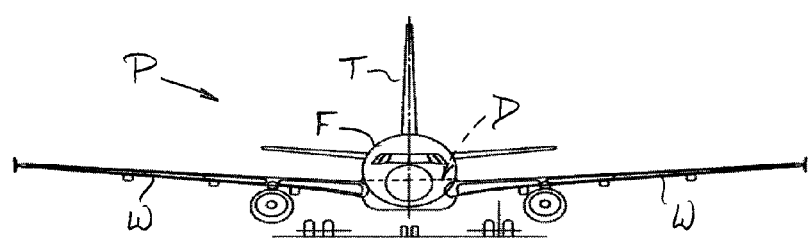
FIG. 10 is a front view of an aircraft which has a rail system according to an embodiment of the subject matter disclosed herein.

FIG. 10 shows an aircraft P comprising a fuselage F, wings W and a tail fin T. The structure of the fuselage F comprises at least one deck D which has a rail system 1 according to the subject matter disclosed herein for assembling or fastening seats, as described above with reference to FIGS. 1 to 9.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rail system, in particular for assembling or fastening seats in an aircraft, comprising:
   an assembly rail;
   a first panel;
   at least one cover element which is movable for covering the assembly rail; and
   a levelling device for levelling a surface of the first panel, when the at least one cover element covers the assembly rail,
   wherein the levelling device has an actuating mechanism for moving a filler element into a filling position,
   wherein the actuating mechanism comprises a screw element, rotation of which is used to bring about a movement of the filler element along a thread axis of the screw element.

2. The rail system according to claim 1, wherein the levelling device comprises a filler element in the first panel, which filler element is movable for filling a recess or depression in the first panel when the cover element covers the assembly rail.

3. The rail system according to claim 2, wherein the filler element can be moved out of an inactive position in the first panel into the filling position in order to level the recess or depression, wherein, in the filling position, an upper surface of the filler element is located substantially in a plane with the surface of the first panel.

4. The rail system according to claim 1, wherein the at least one cover element is movable between a first position in or on the first panel and a second position for covering the assembly rail, wherein an upper surface of the at least one cover element in the second position is located substantially in a plane with a surface of the first panel and merges in a planar manner and substantially smoothly into the surface of the first panel.

5. The rail system according to claim 4, wherein, in the first position, the at least one cover element is received in a recess in or on the first panel.

6. The rail system according to claim 1, wherein the at least one cover element is movable pivotally for covering the assembly rail.

7. The rail system according to claim 6, wherein the at least one cover element is movable pivotally through an angle of 180°.

8. The rail system according to claim 1, wherein the at least one cover element is configured as a rigid or semi-rigid flap, tab, plate or sheet.

9. The rail system according to claim 1, wherein the first panel has a plurality of cover elements which are arranged in a row next to one another along and next to the assembly rail, wherein the assembly rail has a plurality of fastening points arranged at regular intervals, and wherein each cover element is arranged in order to cover a respective fastening point.

10. The rail system according to claim 9, wherein a second panel is a second floor panel for arrangement next to and substantially in parallel with both the assembly rail and the first panel on one side of the assembly rail opposite the first panel.

11. The rail system according to claim 1, comprising a second panel, such that a surface of the second panel is substantially in the plane with the surface of the first panel.

12. The rail system according to claim 1, wherein the assembly rail has a projection for supporting a peripheral region of the first panel, and wherein the at least one cover element is attached to the peripheral region of the first panel.

13. The rail system according to claim 1, wherein the assembly rail comprises a duct for guiding a cabling system, and wherein the at least one cover element also covers the duct in the second position.

14. The rail system according to claim 1, wherein the assembly rail is a seat rail for assembling or fastening a seat in an aircraft, and
   wherein the first panel is a first floor panel for arrangement next to and substantially in parallel with the assembly rail.

15. The rail system according to claim 1, wherein the levelling device is used for levelling a recess or depression in the first panel, when the at least one cover element covers the assembly rail.

16. The rail system according to claim 4, wherein, in the first position, an upper surface of the at least one cover element is located substantially in a plane with an upper surface of the first panel.

17. The rail system according to claim 1, wherein the at least one cover element is displaceable.

18. The rail system according to claim 1, wherein the system has a holder mechanism by which the at least one cover element is held in at least one position for covering the assembly rail.

19. The rail system according to claim 1, wherein the at least one cover element is pretensioned into a position by a spring element.

* * * * *